United States Patent
Hossfeld

(10) Patent No.: US 7,847,991 B2
(45) Date of Patent: Dec. 7, 2010

(54) HOLOGRAPHIC STORAGE MEDIUM

(75) Inventor: Wolfgang Hossfeld, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 570 days.

(21) Appl. No.: 11/715,311

(22) Filed: Mar. 7, 2007

(65) Prior Publication Data

US 2007/0216977 A1    Sep. 20, 2007

(30) Foreign Application Priority Data

Mar. 20, 2006    (EP) ................... 06111396

(51) Int. Cl.
*G03H 1/02* (2006.01)
(52) U.S. Cl. ............................. 359/3; 359/32
(58) Field of Classification Search ............. None
See application file for complete search history.

(56) References Cited

FOREIGN PATENT DOCUMENTS

| EP | 1455246 | 9/2004 |
|---|---|---|
| EP | 1542097 | 6/2005 |
| WO | WO2005/098828 | 10/2005 |

OTHER PUBLICATIONS

Search Report dated Sep. 8, 2006, for EP 06111396.5.

*Primary Examiner*—Arnel C Lavarias
*Assistant Examiner*—Derek S Chapel
(74) *Attorney, Agent, or Firm*—Robert D. Shedd; Jeffrey M. Navon

(57) ABSTRACT

Holographic storage medium which avoids the interference between a reference beam and a reconstructed object beam, wherein the holographic storage medium has a holographic storage layer on top of a reflective layer, and wherein the reflective layer has non-reflective areas as well as reflective areas for coupling a reference beam out of the optical path of a reconstructed object beam.

10 Claims, 4 Drawing Sheets

HOLOGRAPHIC STORAGE MEDIUM

This application claims the benefit, under 35 U.S.C. §119 of EP Patent Application 06111396.5, filed Mar. 20, 2006.

FIELD OF THE INVENTION

The present invention relates to a holographic storage medium, and more specifically to a holographic storage medium which avoids the interference between a reference beam and a reconstructed object beam. The invention further relates to an apparatus for reading such a holographic storage medium.

BACKGROUND OF THE INVENTION

One concept for increasing the capacity of optical storage media is, to use holographic data storage. In this case the surface or the whole volume of the holographic storage medium is used for storing information, not just a few layers as for conventional optical storage media. Furthermore, instead of storing single bits, data are stored as data pages. Typically a data page consists of a matrix of light-dark-patterns, which code multiple bits. This allows to achieve increased data rates in addition to the increased storage density. One further advantage of holographic data storage is the possibility to store multiple data in the same volume, e.g. by changing the angle between the two beams or by using shift multiplexing, etc.

In holographic data storage digital data are stored by recording the interference pattern produced by the superposition of two coherent laser beams, where one beam, the so-called 'object beam', is modulated by a spatial light modulator and carries the information to be recorded in the form of the data pages. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam. According to one holographic storage approach the reconstructed object beam is read in transmission (transmission type holographic storage medium). For this approach an optical system is needed on both sides of the holographic storage medium. A different approach is to read the reconstructed object beam in reflection (reflection type holographic storage medium). In this case only a single optical system is required. For this purpose the rear side of the holographic storage medium is coated with a mirror layer. The reconstructed object beam is reflected by this mirror layer and can be read from the same side as used for recording.

In both approaches a superposition of the reference beam and the reconstructed object beam may disturb read-out of the reconstructed object beam. This is especially the case when the reference beam is a spherical wave, which spreads into a large angular range. In addition, during recording the reference beam may illuminate the storage material outside the area of interference with the object beam. This effect uses up a part of the dynamics of the storage material without actually recording data.

One known solution to prevent the interference between the reference beam and the reconstructed object beam is to design the optics in such a way that the reference beam does not reach the read-out lens. This is, however, a limitation for the design. Another solution, which is disclosed for example in EP 1 080 466 B1, is to apply confocal filtering to suppress the reference beam. This, however, further complicates the optical set-up.

SUMMARY OF THE INVENTION

It is an object of the invention to propose a holographic storage medium which avoids the interference between the reference beam and the reconstructed object beam.

According to the invention, this object is achieved by a holographic storage medium with a holographic storage layer on top of a reflective layer, wherein the reflective layer has non-reflective areas as well as reflective areas for coupling a reference beam out of the optical path of a reconstructed object beam.

The reference beam is coupled out of the optical path where it could disturb the reconstructed object beam and/or illuminate the holographic storage material. This is realized with a storage medium having both reflecting and non-reflecting areas, e.g. transmitting or absorbing areas. These areas are designed in such way that the reference beam is either transmitted through the holographic storage medium or absorbed, while the reconstructed object beam is reflected. It is likewise possible to design the areas such that the reconstructed object beam is transmitted, while the reference beam is reflected. Both solutions solve two problems that arise in holographic data storage systems working with reflective read-out of data. Firstly, after reconstruction of the object beam the reference beam does not overlap with the reconstructed object beam, i.e. it does not disturb the data read-out. Secondly, during recording the reference beam does no longer illuminate the holographic storage material without interfering with the object beam. It does, therefore, not partly consume the dynamic range of the holographic storage material without storing data.

Advantageously, a spacer layer is arranged between the holographic storage layer and the reflective layer. This simplifies the separation of the optical paths of the reference beam and the reconstructed object beam, as it allows to increase the distance between the beams on the reflective layer.

Preferably, the non-reflective areas are arranged beside an area of the holographic storage layer where holograms are recorded. For a reflection type holographic storage medium, this arrangement is especially suitable if the optical axis of the reference beam is inclined with regard to the surface of the holographic storage medium. In this case the optical axis of the reconstructed object beam is either perpendicular to the surface or also inclined. Alternatively, the non-reflective areas are arranged below an area of the holographic storage layer where holograms are recorded. This arrangement is especially suitable if the optical axis of the reference beam is perpendicular to the surface of the holographic storage medium. In this case the optical axis of the reconstructed object beam is inclined with regard to the surface. For a transmission type holographic storage medium, the transparent areas are arranged below the area of the holographic storage layer where holograms are recorded when the optical axis of the reconstructed object beam is perpendicular to the surface of the holographic storage medium. Alternatively, the transparent areas are arranged beside the recording area of the holographic storage layer when the optical axis of the reconstructed object beam is inclined with regard to the surface of the holographic storage medium.

According to one aspect of the invention, the holographic storage medium is a disk-shaped storage medium. Disk-shaped holographic storage media offer the advantage that they may be used in holographic storage devices that are also capable of playback or recording of current optical storage media, such as Compact Disk, Digital Versatile Disk, BluRay Disk etc. In this case the non-reflective areas are concentric rings or a spiral. They may likewise consist of a plurality of individual non-reflective areas arranged in concentric rings or a spiral. The individual areas are circular or rectangular areas, for example.

According to another aspect of the invention the holographic storage medium is a card-shaped storage medium. In this case the non-reflective areas are lines or a plurality of individual non-reflective areas arranged in lines.

Preferably, in an apparatus for reading and/or recording a holographic storage medium according to the invention, a reference beam generated by a light source is arranged inclined with respect to the optical path of a reconstructed object beam such that either the reference beam impinges on non-reflective areas of the reflective layer or the reconstructed object beam impinges on non-reflective areas of the reflective layer. In both cases the relative inclination of the optical axes allows to separate the optical paths of the reference beam and the reconstructed object beam using the special holographic storage medium.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
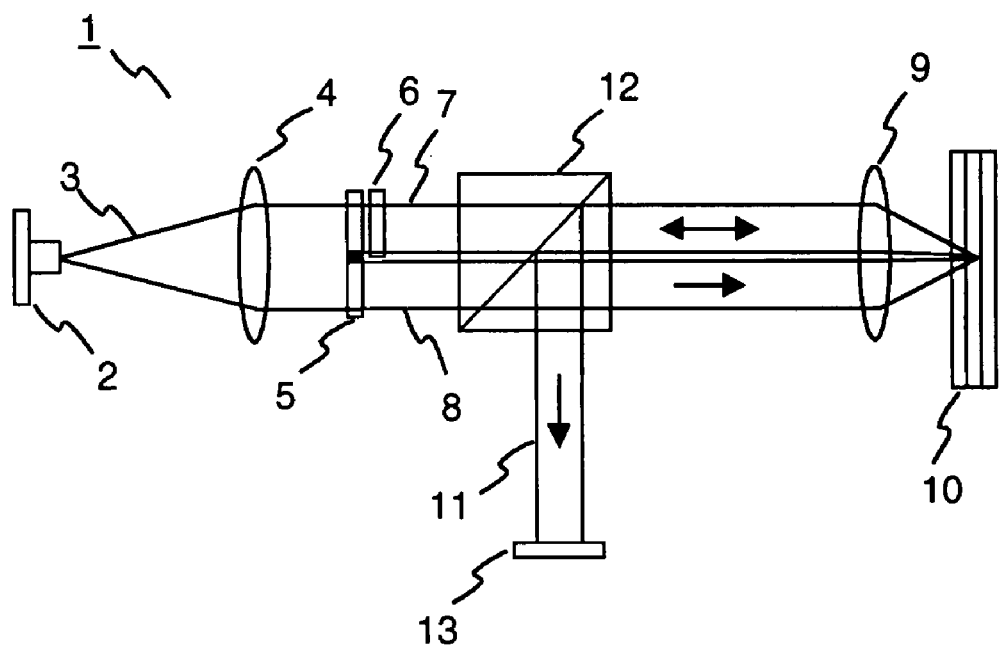
FIG. 1 schematically depicts a holographic pickup used in a holographic storage system.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 10, e.g. a holographic disk or card, by an objective lens 9. At the intersection of the object beam 7 and the reference beam 8 an interference pattern appears, which is recorded in a photo-sensitive layer of the holographic storage medium 10.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data.

Figure 2:
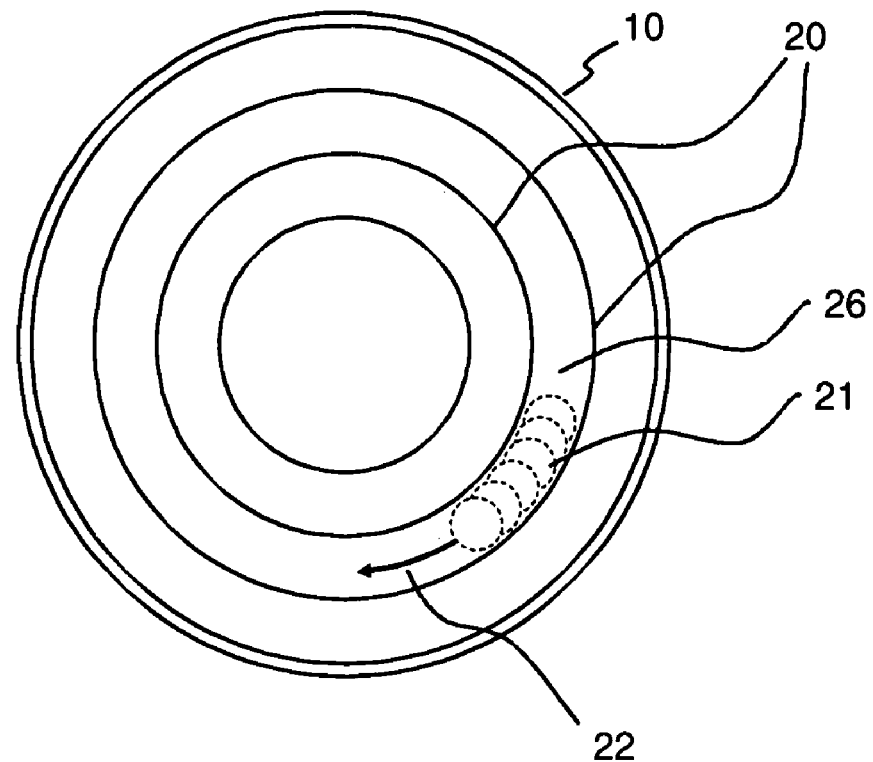
FIG. 2 depicts a top view of a holographic storage medium according to the invention.

In FIG. 2 a top view of a disk-shaped holographic storage medium 10 according to the invention is shown. The holograms 21 are indicated by the dashed circles. They may be written along the writing direction 22 in an overlapping manner using a suitable multiplexing method, such as shift multiplexing or correlation multiplexing, in order to obtain a higher data density on the holographic storage medium 10. The holographic storage medium 10 includes a reflection layer 26. The main area of this reflection layer 26, which corresponds to the hologram recording area, is reflectively coated. However, situated beside the recording area of the holograms 21 are transparent, absorbing or structured areas 20. In the figure these areas 20 are indicated by concentric black circles. They may likewise consist of a plurality of small individual areas, e.g. one rectangular or circular area for each hologram 21. In addition, the transparent areas 20 can likewise form a spiral instead of concentric circles. The width of the transparent areas 20 is mainly determined by the focus diameter of the reference beam 8. In a typical setup having a hologram size of about 200 μm the transparent areas 20 have a width of 2 μm.

Figure 3:
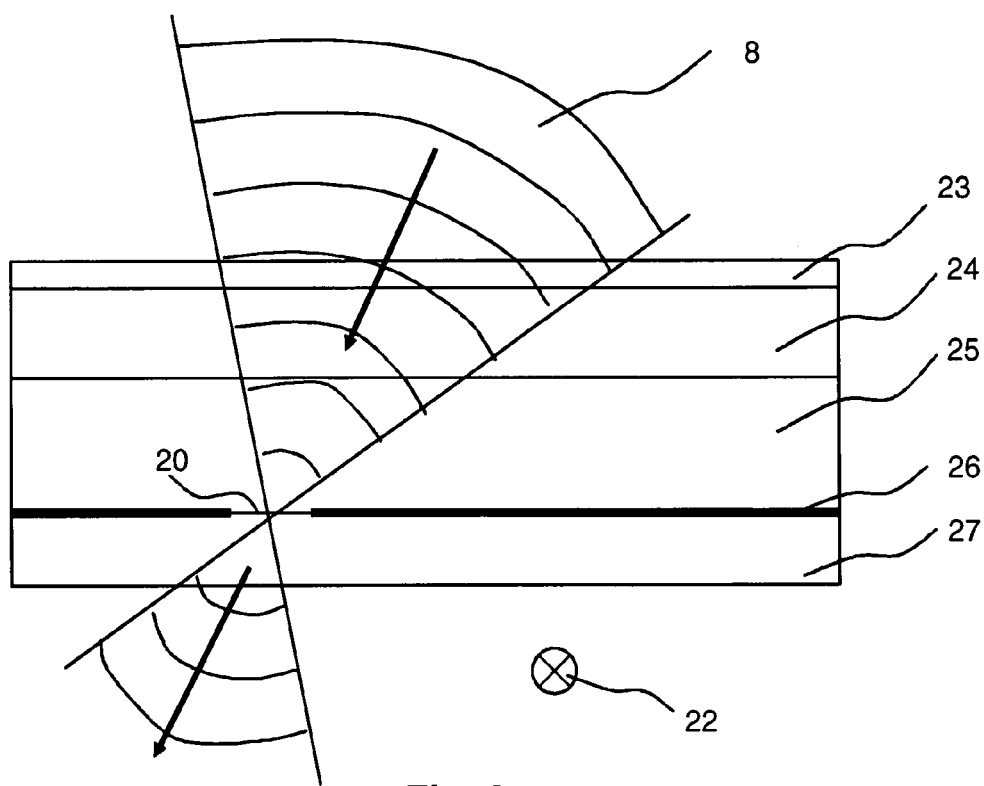
FIG. 3 illustrates the cross-section of the holographic storage medium according to the invention, FIG. 4 schematically shows the propagation of the object beam through the holographic storage medium during recording.

FIG. 3 illustrates the cross-section of the holographic storage medium 10 according to the invention. Also illustrated is the propagation of a spherical reference beam 8 during recording and read-out. The beam 8 travels through a cover layer 23, a holographic storage material layer 24, and a spacer layer 25. The optical axis of the reference beam 8 is chosen in such a way that the beam 8 does not impinge on the reflective layer 26, but is transmitted through the transparent area 20 and the substrate material 27. The focus of the reference beam 8 is situated in the reflective layer 26. This allows to keep the transparent area 20 very small. As the reference beam 8 is transmitted, it can not pass through the holographic storage material layer 24 again. Therefore, any uncontrolled illumination of this layer 24 is avoided. If the reference beam 8 was reflected back through the holographic storage material layer 24 without interfering with an object beam 7, no data would be recorded and the storage material would be wasted without any use. In the present example transparent areas 20 are provided for avoiding reflection of the reference beam 8 back through the holographic storage material layer 24. However, it is likewise possible to use structured areas, which direct the reference beam 8 into a different direction, or absorbing areas, which absorb the reference beam 8. The transparent areas 20 are preferably produced by etching. In case of absorbing areas, printing processes are advantageously used.

Figure 4:
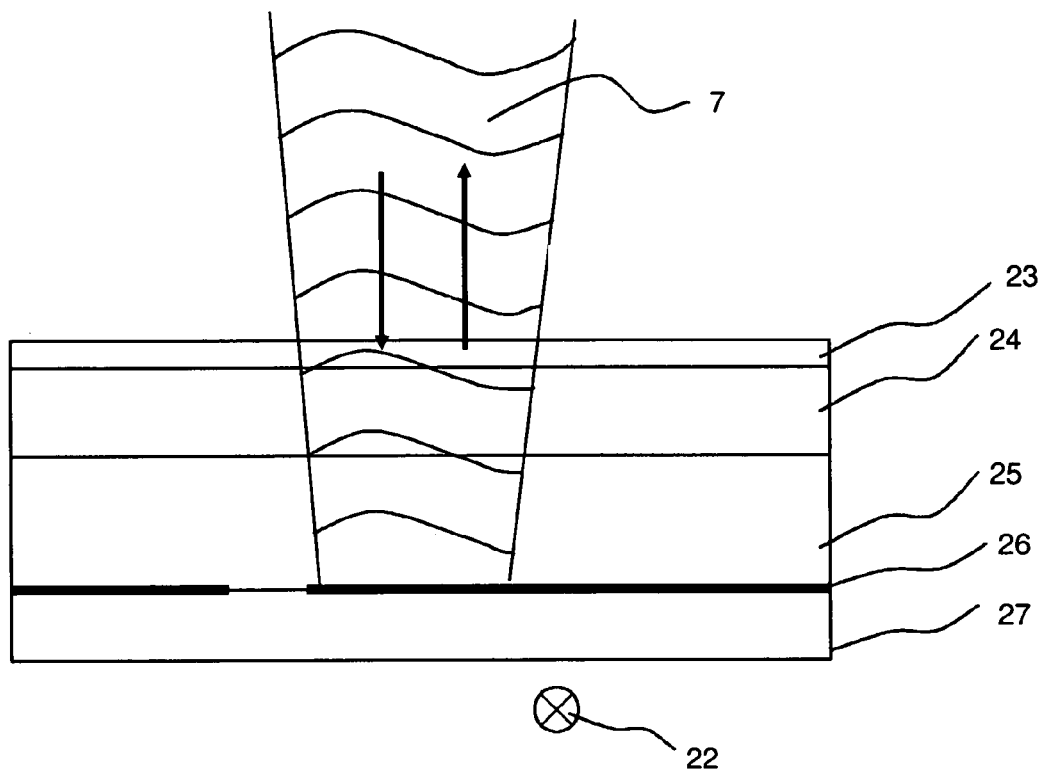

The propagation of the object beam 7 through the holographic storage medium 10 during recording is schematically shown in FIG. 4. Contrary to the case of the reference beam 8 the object beam 7 is reflected by the reflective layer 26. In the example in FIGS. 3 and 4 the optical axis of the object beam 7 is perpendicular to the surface of the holographic storage medium 10, while the optical axis of the reference beam 8 is inclined with respect to the surface. However, it is likewise possible to use an inclined optical axis for the object beam 7 and a perpendicular optical axis for the reference beam 8. In this case the transparent areas 20 are arranged below the recorded holograms 21. A further alternative is to use an inclined optical axis for both the object beam 7 and the reference beam 8.

Figure 5:
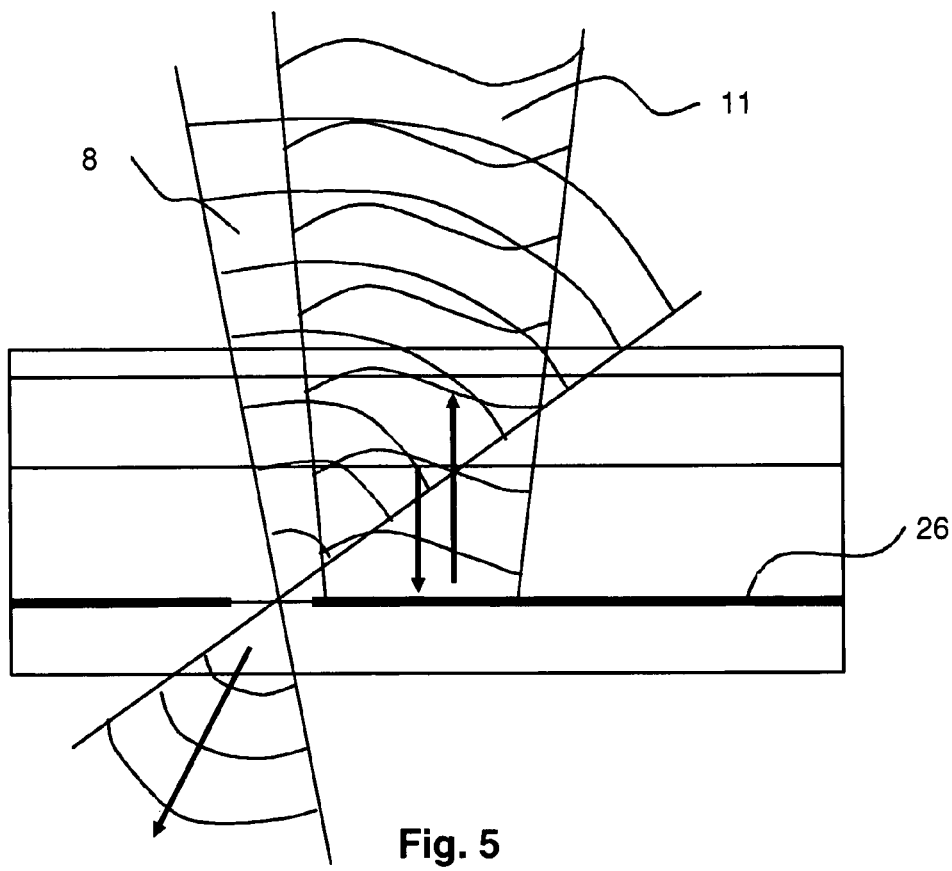
FIG. 5 depicts the propagation of the reference beam and the reconstructed object beam during read-out.

FIG. 5 depicts the propagation of the spherical reference beam 8 and the reconstructed object beam 11 during read-out. Contrary to the reference beam 8 the reconstructed object beam 11 is reflected by the reflective layer 26. The reference beam 8 is transmitted (or blocked) and coupled out of the optical path of the reconstructed object beam 11. Thus it does not disturb the read-out of the reconstructed object beam 11.

Figure 6:
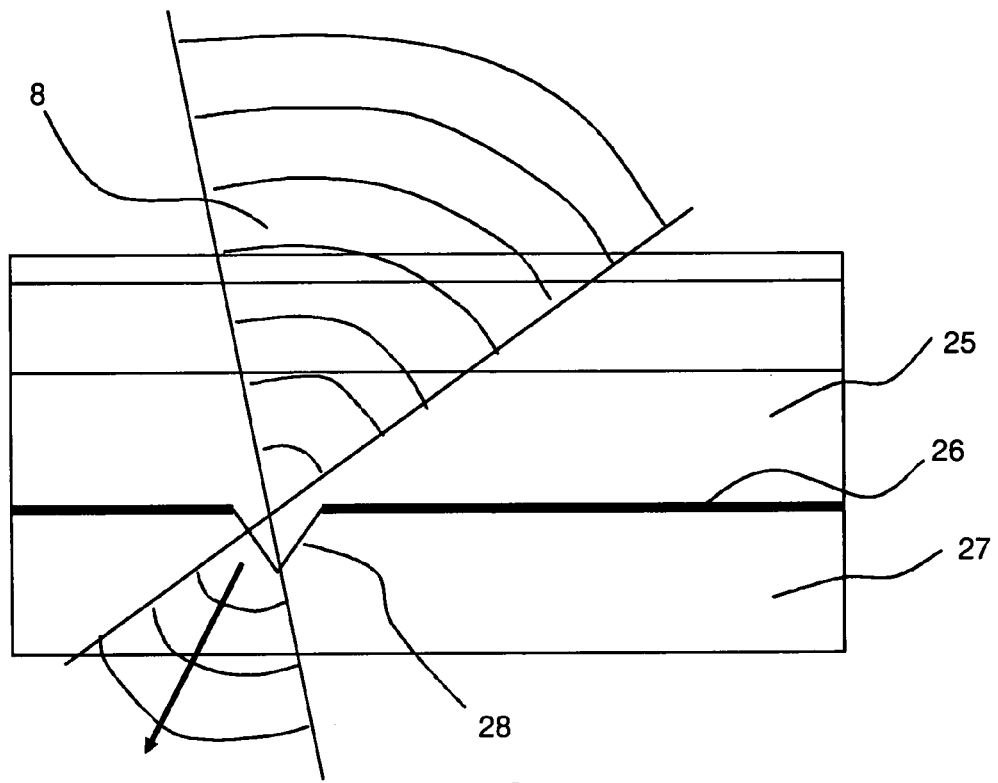
FIG. 6 illustrates a holographic storage medium according to the invention using a structured area.

In FIG. 6 the cross-section of a holographic storage medium 10 is shown, where the transparent area 20 is implemented as a v-shaped pit 28 in the substrate material 27. Alongside the pit 28 there is no reflective coating in the reflective layer 26 between the spacer layer 25 and the substrate material 27. Therefore, the reference beam 8 is transmitted at this location. The v-shaped pit 28 has the advantage that it can easily be manufactured, e.g. by applying a reflective coating on the plane substrate 27 and subsequently milling v-shaped grooves or pits. Afterwards the remaining layers are added. Alternatively, a substrate 27 already having v-shaped grooves may by sputtered aslant, such that the grooves are only partially covered with a reflecting layer.

Figure 7:
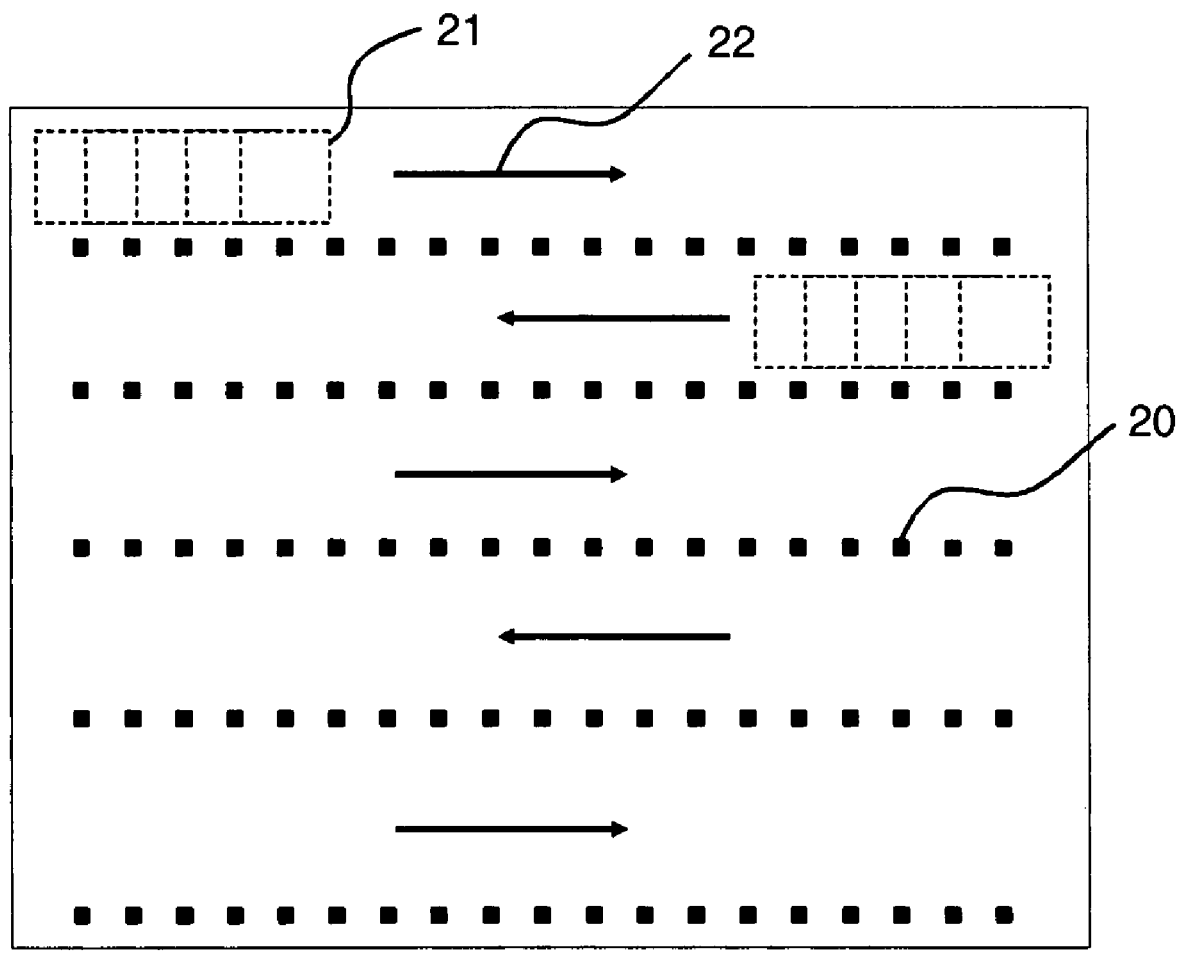
FIG. 7 shows a top view of a rectangular holographic storage medium according to the invention.

FIG. 7 depicts the top view of a rectangular holographic storage medium 10 according to the invention. The transparent areas are realized as rows of small rectangular areas 20. The transparent areas 20 of each row may likewise be combined to a single, continuous transparent area. The holograms 21, which are indicated by the overlapping dashed rectangles, are recorded in direction 22 along the transparent rectangles.

What is claimed is:

1. A holographic storage medium with a holographic storage layer on top of a reflective layer, the reflective layer having non-reflective areas as well as reflective areas for coupling a reference beam out of the optical path of a reconstructed object beam, wherein the non-reflective areas are displaced within the plane of the reflective layer relative to an area of the holographic storage layer where holograms are located, such that the non-reflective areas do not or only partially lie below the area of the holographic storage layer where holograms are located, and such that for each non-reflective area a center of said non-reflective area does not lie below a center of any of said holograms.

2. The holographic storage medium according to claim 1, further having a spacer layer between the holographic storage layer and the reflective layer.

3. The holographic storage medium according to claim 1, wherein the holographic storage medium is a disk-shaped storage medium.

4. The holographic storage medium according to claim 3, wherein the non-reflective areas are concentric rings or a spiral, or a plurality of individual non-reflective areas arranged in concentric rings or a spiral.

5. The holographic storage medium according to claim 1, wherein the holographic storage medium is a card-shaped storage medium.

6. The holographic storage medium according to claim 5, wherein the non-reflective areas are lines or a plurality of individual non-reflective areas arranged in lines.

7. The holographic storage medium according to claim 1, wherein the non-reflective areas are transparent or absorbing areas.

8. An apparatus for writing to a holographic storage medium with a holographic storage layer on top of a reflective layer, the reflective layer having non-reflective areas as well as reflective areas for coupling a reference beam out of the optical path of an object beam or a reconstructed object beam, the non-reflective areas being displaced within the plane of the reflective layer relative to an area of the holographic storage layer where holograms are located, such that the non-reflective areas do not or only partially lie below the area of the holographic storage layer where holograms are located, and such that for each non-reflective area a center of said non-reflective area does not lie below a center of any of said holograms, the apparatus having a light source for generating the reference beam and the object beam, wherein the reference beam is arranged inclined with respect to the optical path of the object beam on the way towards the holographic storage medium such that either the reference beam or the object beam impinges on a non-reflective area of the reflective layer.

9. The apparatus according to claim 8, wherein the focus of, the reference beam is situated in the reflective layer.

10. A method for writing to a holographic storage medium having a holographic storage layer on top of a reflective layer, the reflective layer having non-reflective areas as well as reflective areas for coupling a reference beam out of the optical path of an object beam, the non-reflective areas being displaced within the plane of the reflective layer relative to an area of the holographic storage layer where holograms are located, such that the non-reflective areas do not or only partially lie below the area of the holographic storage layer where holograms are located, and such that for each non-reflective area a center of said non-reflective area does not lie below a center of any of said holograms, having the steps of:

generating the object beam and the reference beam;

inclining the reference beam with respect to the optical path of the object beam on the way towards the holographic storage medium; and illuminating the holographic storage medium with the object beam and the reference beam such that either the reference beam or the object beam impinges on a non-reflective area of the reflective layer of the holographic storage medium.

* * * * *